Patented Mar. 29, 1932

1,851,203

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

COMPOUND FOR TREATMENT OF OILS

No Drawing.　　　Application filed October 8, 1928.　Serial No. 311,244.

This invention is a compound for use in purifying and reclaiming oils.

In the art of purifying and reclaiming used or contaminated oils, the only methods which appear to be commercially successful at the present time are those which involve distillation steps similar to those usually practiced in the treatment of crude oil. These methods while more or less successful are open to the objection that expensive apparatus is required for reclaiming the oils, and there is a great loss in the bulk of the reclaimed oil as compared to the volume of contaminated oil treated. Other methods and apparatus have been tried which involve filtering and bleaching operations, but they do not appear to have been commercially successful. One reason is that in the case of used crank case oil, for instance, it has been found impossible to remove the minute carbon particles which are suspended in the oil by filtration. The same is true with respect to the gummy substances or what may be termed the "rosins" which are also suspended in the oil.

In a separate application filed concurrently herewith Serial No. 311,239 is described and claimed a process of precipitating mechanical impurities carried by oils, by the use of plaster of Paris or calcium sulphate deposited in the oil, and no claim is made herein for this broad subject matter. As pointed out in the said application the mechanical impurities suspended in oil such as the gummy substances which many times discolor new oil, and the carbon and other impurities which have been taken up by used oil, such as crank case oil and the like are precipitated by bringing the oil into contact with plaster of Paris or similar calcareous substances.

In the art of purifying oils it is also sometimes desirable to subject the oil to the so-called "acid treament" i. e. to the action of sulphuric acid for the purpose of removing impurities which cannot be reached by any other known method. But in the acid treatment as now commonly practiced in the art there is always danger of using too much acid, with the result that the acid will be discolored to a more or less permanent degree, and to a sufficient extent to impair its commercial value.

One of the objects of the invention is to provide a compound to be introduced into the oil to be treated, whether for the purpose of reclaiming used or contaminated oils, or for purification treatment of other oils, by means of which the oil may be subjected to an acid treatment while the impurities which are to be removed are being precipitated to such an extent that they may be completely removed by filtration and without the necessity of employing expensive and cumbersome distilling apparatus. A further object is to produce a compound of the character described which is exceedingly cheap and by the use of which the purifying process is not only simplified and cheapened, but in addition thereto the loss in bulk during the reclaiming or purifying process is reduced to such an extent as to be practically negligible.

The invention will be hereinafter fully described and particularly pointed out in the claims.

The compound forming the subject matter of the present invention consists of a mixture of silica and sulphuric acid with calcium sulphate and clay. While it is preferred to use calcium sulphate as an ingredient, either in the form of plaster of Paris or gypsum, the invention is not limited to this substance because other calcareous cements may be employed in lieu thereof, such as calcium sulphate, natural cement, Portland cement and the like, and wherever the term gypsum is used in this specification, it is to be understood that the substances above mentioned are to be considered as equivalents thereof and within the spirit of the invention.

The action of the calcium sulphate as an element of the present compound is identical with that described and claimed in the application for patent above referred to. That is when brought into contact with the oil, either by depositing it into the oil or by making it a substantial constituent of an oil filter, the minute particles of carbon, gums and the like, which are suspended in oil, such as used crank-case oil for instance, are brought together in such a manner that they may be readily removed. If the first method is employed the impurities may be removed by filtration or by allowing them to settle, and draw off the oil. If the second method is employed, the impurities are attracted as they come in contact with the filter bed, and removed as the oil passes through. The carbon particles are ordinarily too fine to be removed by filtration, and the effect of the calcium sulphate is to cause these particles to assume a form and condition by which mechanical separation thereof from the oil may be easily accomplished.

Experience has demonstrated that the introduction of sulphuric acid into the oil simultaneously with the calcium sulphate, and in the absence of any modifying or controlling agencies, tends to destroy the action of the calcium sulphate, because said last mentioned material as soon as it comes into contact with the acid will cake or harden, or both, and its precipitating efficiency is destroyed. In a copending application Serial No. 311,240 filed concurrently herewith, however, is described and claimed a compound for effectively accomplishing the acid treatment of oils. Said compound consists of a mixture of sulphuric acid and silica. It has been discovered that by mixing this compound with the calcium sulphate, the acid treatment of the oil may be effectively carried out, without in any manner impairing or destroying the precipitating properties of the calcium sulphate. It is to be understood, however, that no claim is made herein to the broad mixture consisting of sulphuric acid and silica, because such claims are included in the application above identified, but that the present case is limited to the combination of said acid mixture with calcium sulphate and clay.

In this connection, it is to be understood that by the term "clay" as used herein is meant any of the clay or clay-like material well known in the art for filtering and bleaching oils. The different clays are known to vary somewhat in their chemical and physical characteristics, but all clays which are capable of filtering oil, or of bleaching oil, or both are considered to be within the spirit of this invention. The clay must, of course, be treated as to eliminate any water carried thereby, and any desired proportions may be used.

Experience has demonstrated that excellent results are obtained by a mixture of 450 pounds of calcium sulphate, 450 pounds of clay, and 100 pounds of the acid treated silica, but the invention is not limited to these proportions, which may be varied to suit different conditions without departing from the spirit of the invention.

The ingredients are compounded in any suitable or desired manner, but it is preferred to produce the acid treated silica by mixing sulphuric acid with the powdered silica in a suitable receptacle and in any desired manner. The proportions may vary to suit conditions, but experience has demonstrated that the proportions of one gallon of sulphuric acid to 100 pounds of finely powdered silica is an excellent proportion for average conditions, so that the normally insoluble particles of silica are thinly coated with the acid, as set forth in the above identified application for patent. The calcium sulphate and the clay may then be added to the acid treated silica separately, or they may be first mixed by any suitable method and then thoroughly intermingled with acid treated silica. The efficacy of the mixture does not depend upon any particular method of mixing, but the ingredients must be uniformly distributed throughout the mass. As pointed out in the application above identified, it is preferred that the silica be in the form of powdered quartz or high grade sand of approximately 300 mesh.

In practice, the compound is brought into contact with the oil to be treated by filtering the oil through a bed constructed of said compound, or of which the compound is a component part.

The advantages of the invention will be readily understood by those skilled in the art of purifying and reclaiming oils. An important advantage is that the purification of the oil, by removing mechanical impurities such as carbon and gummy substances may be accomplished simultaneously with an acid treatment of the oil. With the ingredients compounded in the manner above described the calcium sulphate will not cake or harden, probably because the silica crystals become coated with the acid and the distribution of the acid is such that the objectionable reaction of the acid upon the calcium sulphate is prevented. Apparently the silica acts as an acid carrier to distribute the acid uniformly throughout the oil so that there is insufficient concentration at any point to burn the oil. The absorbent characteristics of the calcium sulphate apparently are such that they have the effect of collecting and depositing the carbon and gummy impurities, so that they may be readily separated. The anhydrous nature of calcium sulphate may possibly be a factor in the action produced thereby. It is to be understood, however, that the above stated theories are more or less conjectural and are not intended to be binding or limiting, the significant fact being that the calcium sulphate does so act upon the mechanically suspended impurities that they may be readily separated from the oil, and the acid introduced into the oil by the method described does not burn or discolor the oil. The clay enhances the purifying action of the other ingredients by bleaching the oil simultaneously with the filtering of the oil to remove the deposited impurities carried thereby.

Having thus explained the nature of the invention and described an operative manner of constructing and using the same, although without attempting to set forth all of the forms in which it may be made, or all of the forms of its use, what is claimed is:—

1. A compound for purifying oil comprising a mixture of equal quantities of calcium sulphate and clay compounded with a mixture of sulphuric acid and powdered silica.

2. A compound for purifying oil comprising a mixture of sulphuric acid and clay compounded with a mixture of sulphuric acid and silica in the proportions of one gallon of sulphuric acid and 100 pounds of powdered silica.

3. A compound for purifying oil comprising a mixture of equal quantities of sulphuric acid and clay compounded with a mixture of sulphuric acid and powdered silica in the proportions of one gallon of acid to 100 pounds of silica.

4. A compound for purifying oil comprising a mixture of calcium sulphate and clay in the proportions of 450 pounds of each compounded with 100 pounds of a mixture of sulphuric acid and silica in the proportions of 1 gallon of acid to 100 pounds of silica.

5. A compound for purifying oils comprising a mixture of clay with a substantial quantity of extraneous gypsum existing independently of any chemical reaction upon said clay combined with silica particles coated with sulphuric acid.

6. A compound for purifying oils comprising calcium sulphate mechanically mixed with normally insoluble silica particles and sulphuric acid combined with a mechanical mixture of clay with a substantial quantity of extraneous gypsum existing independently of any chemical reaction upon said clay.

In testimony whereof I have hereunto set my hand.

HENRY H. MORETON.